Nov. 18, 1941.　　　E. E. HEWITT　　　2,263,336
BRAKE CONTROL MEANS
Filed Jan. 27, 1940
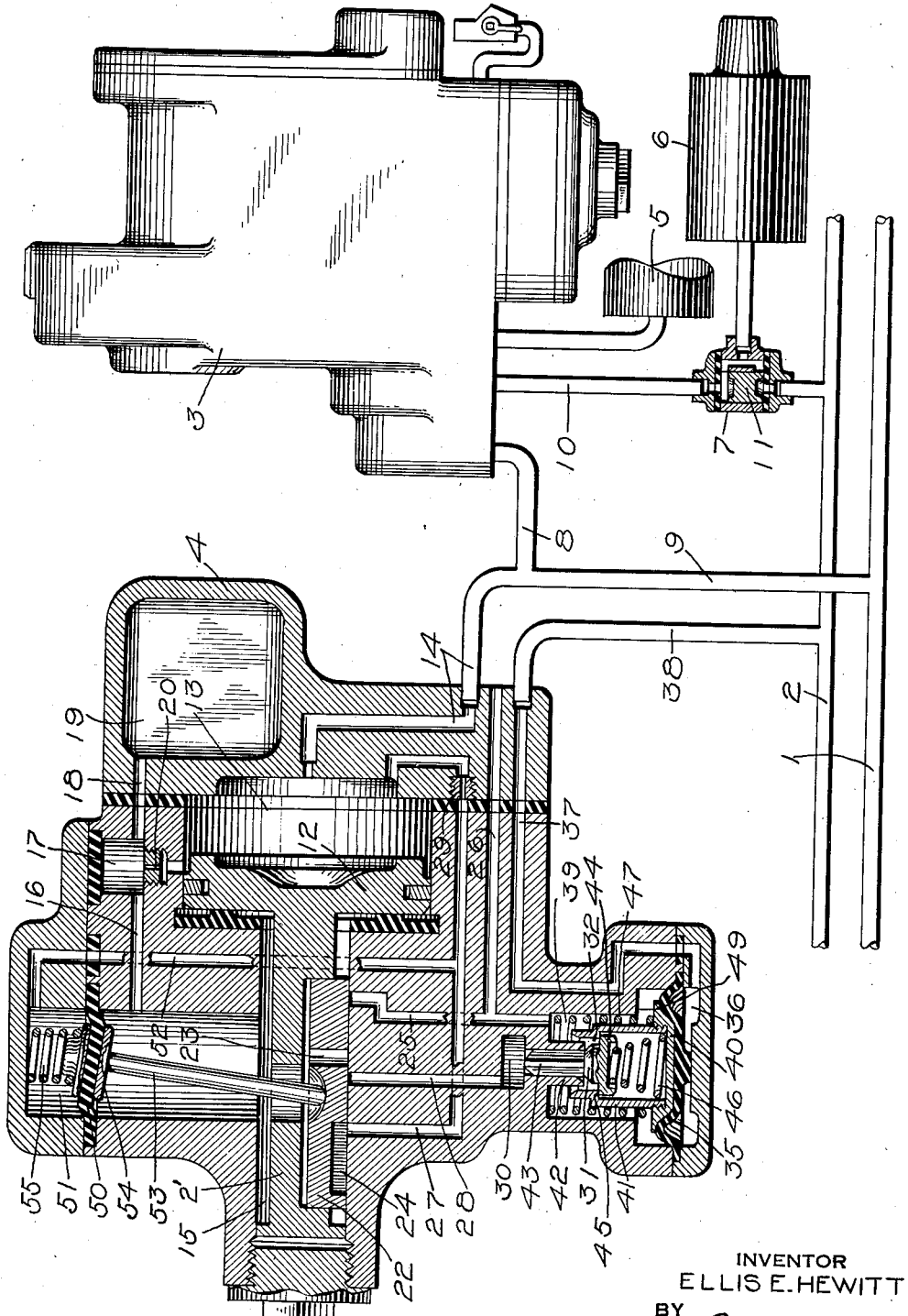
INVENTOR
ELLIS E. HEWITT
BY
ATTORNEY Patented Nov. 18, 1941

2,263,336

UNITED STATES PATENT OFFICE 2,263,336

BRAKE CONTROL MEANS

Ellis E. Hewitt, Edgewood, Pa., assignor to The Westinghouse Air Brake Company, Wilmerding, Pa., a corporation of Pennsylvania Application January 27, 1940, Serial No. 315,924

12 Claims. (Cl. 303—26)

This invention relates to fluid pressure brakes for railway vehicles and more particularly to the combined automatic and straight air type of fluid pressure brake equipment.

In Patent No. 2,152,257, issued March 28, 1939, to Donald L. McNeal and myself, there is disclosed a combined automatic and straight air brake equipment including an automatic brake controlling valve device having quick service means for locally venting fluid under pressure from the brake pipe in order to effect rapid propagation of the reduction in brake pipe pressure upon initiating an application of the brakes. Means are also provided to operate at the time a relatively low predetermined degree of brake application is obtained, as for example due to fourteen pounds pressure in the brake cylinder device of the equipment, to close the communication through which fluid under pressure is vented from the brake pipe by the quick service means. Accordingly, after an automatic service application of the brakes has been initiated and the degree of brake application has been increased to the above mentioned predetermined degree, the quick service means is cut out and therefore rendered ineffective for any further reductions in brake pipe pressure, such as are made, for example, in graduating an application of the brakes.

Under certain conditions it is desirable that cars equipped with the above combined automatic and straight air brake equipment be operated in mixed trains including cars equipped with the well known Universal valves. On trains equipped with Universal valves it is customary to graduate an application of the brakes, i. e. apply the brakes in a series of successive steps, and in order that each step of the application will be effected promptly and uniformly on all cars through the train, the Universal valves are provided with quick service means which operate upon each reduction in brake pipe pressure, regardless of the degree of brake application. It will therefore be apparent that, except for the initial reduction in brake pipe pressure, brake controlling valve devices such as above described will not cooperate with Universal valves in mixed trains to provide for rapid propagation of a service reduction in brake pipe pressure, and consequently will not permit a uniform graduated application of brakes on such trains, since the quick service means in said brake controlling valve devices is ineffective after the initial brake pipe reduction.

Various means have been proposed to overcome the above described difficulty, one of which, as disclosed in Patent No. 2,170,250, issued August 22, 1939, to J. W. Rush, consists of the provision of an additional quick service means adapted to be associated with the above mentioned brake controlling valve device on each car equipped therewith and this additional quick service means is adapted to operate on each reduction in brake pipe pressure so that cars so equipped will operate in mixed trains in harmony with cars equipped with Universal valves in graduating an application of the brakes.

In trains, all cars of which are equipped for combined automatic and straight air brake control, it is undesirable that the additional quick service means just described be operative during a straight air application of the brakes for reasons which will now be brought out.

In combined automatic and straight air brake equipment it is customary to use the same brake cylinder device for applying the brakes on the vehicle either automatically or by straight air and on account of this a double check valve device is usually employed to close communication between the straight air pipe and the brake cylinder device, or application and release pipe or passage through which the brake cylinder pressure is controlled, when the brakes on the vehicle are controlled automatically. When the brakes on the vehicle are controlled by straight air the double check valve device is adapted to operate to close communication between the brake cylinder device, or application and release passage, and the automatic brake controlling valve device.

When on a train equipped for both automatic or straight air control the brakes are applied by straight air unavoidable fluctuations in pressure in the brake pipe will occur and the additional quick service means above described might respond to such fluctuations and initiate a quick service reduction in brake pipe pressure which would be transmitted through the train and cause the brake controlling valve devices on the train to operate and supply fluid under pressure to the automatic side of the double check valve device. Any such unintentional supply of fluid to the automatic side of the double check valve device is of no material significance while the brakes on the cars are applied by straight air, but still is very objectionable, since in releasing a straight air application of brakes such pressure will act, as soon as the straight air pipe pressure is reduced sufficiently, to shift the double check valve device from its proper position to cut off the further straight air release of fluid from the application and release pipe and thereby from the brake cylinder device with the result that the brakes on the vehicle will be maintained applied with a brake cylinder pressure substantially equal to the pressure of fluid supplied by the brake controlling valve device.

The operator has no way of knowing that the brakes on the vehicle may be thus unintentionally applied, with the result that while the train is in motion the usual brake shoes will drag against the wheels and cause unnecessary wear and heating of both the shoes and wheels. More serious damage is liable to occur, however, when the train is put in motion after a stop since then the undesired retained application of brakes is liable to cause the wheels to slide on the track rails, thus causing flat spots to be worn on the wheels.

The principal object of the present invention is therefore to provide an improved combined automatic and straight air brake equipment embodying quick service means adapted during automatic control of the brakes to respond to each reduction in brake pipe pressure to effect a quick service reduction in brake pipe pressure and further embodying means for rendering said quick service means ineffective during straight air control of the brakes so as to avoid the difficulty just described.

Another object of the invention is to provide in a combined automatic and straight air brake equipment an additional quick service valve device of the general type above described and means operative promptly upon initiating a straight air application of the brakes for rendering said quick service valve device inoperative to effect a quick service reduction in brake pipe pressure during said straight air application.

Still another object of the invention is to provide an improved combined automatic and straight air brake equipment of the general type disclosed in the aforementioned Patent No. 2,152,257 but embodying an additional quick service means for rendering said brake equipment operable in harmony with brake equipment of the well known Universal valve type and further embodying means for rendering said quick service means ineffective during straight air operation of the brake equipment.

Other objects and advantages will be apparent from the following more detailed description of the invention.

In the accompanying drawing the single figure is a diagrammatic view, partly in section and partly in outline, of a combined automatic and straight air fluid pressure brake equipment embodying the invention.

As shown in the drawing the brake equipment comprises a brake pipe 1, a straight air pipe 2, an automatic brake controlling valve device 3, an auxiliary quick service valve device 4, a supply reservoir 5, a brake cylinder device 6, and a double check valve device 7.

The brake controlling valve device 3, which is connected to brake pipe 1 through pipes 8 and 9 may, for the purpose of illustration, be the same as that disclosed in the above mentioned Rush Patent No. 2,170,250 and as explained in that patent said valve device is adapted to operate upon a reduction in pressure in the brake pipe 1 to supply fluid under pressure from the reservoir 5 to an application and release pipe 10 for effecting an automatic application of the brakes on the car and upon an increase in pressure in the brake pipe 1 to release fluid under pressure from the pipe 10 for effecting a release of the brakes on the car.

The application and release pipe 10 leads to one end of the double check valve device 7 which comprises a valve element 11 adapted to be operated by the fluid supplied to said pipe for opening communication to the brake cylinder device so that the pressure in the brake cylinder device may be controlled through said pipe by the brake controlling valve device 3 in accordance with variations in pressure in the brake pipe.

The brake controlling valve device 3 also includes quick service means adapted to operate when a reduction in brake pipe pressure is initiated to effect a quick service reduction in brake pipe pressure for propagating the reduction in brake pipe pressure through a train in the usual manner. This quick service means is controlled by the degree of pressure obtained in the brake cylinder device 6 and is operative when said pressure is increased to a relatively low degree, such as 14 lbs., to close the communication through which the quick service venting of fluid from the brake pipe occurs so as to prevent further quick service activity during the brake application.

It will, therefore, be noted that after an automatic service application of the brakes has been initiated by a reduction in pressure in brake pipe 1 and the degree of brake application has been increased to the above mentioned predetermined degree, the quick service means in the brake controlling valve device 3 is cut out or rendered ineffective for any further reductions in brake pipe pressure. A further showing or description of the brake controlling valve device 3 is not deemed essential to an understanding of the present invention.

It will be noted that when the valve element 11 in the double check valve device 7 is subjected to fluid pressure supplied to pipe 10 in effecting an automatic application of the brakes on the car, said valve opens communication between said pipe and the brake cylinder device 6 and closes communication between said brake cylinder device and the straight air pipe 2.

In effecting an application of the brakes on the car by straight air fluid under pressure is adapted to be supplied to the straight air pipe 2 in any desired manner and to flow therefrom to the double check valve device 7 and therein act on the valve element 11 on the end opposite pipe 10. The valve element 11 is thereby adapted to be moved in the direction of pipe 10 to close communication between said pipe and the brake cylinder device and to connect the brake cylinder device 6 to the straight air pipe 2 whereupon the pressure of fluid in said brake cylinder device is adapted to be varied in accordance with variations in pressure in the straight air pipe 2.

This operation of the double check valve device 7 to isolate the automatic application and release pipe 10 from the brake cylinder device 6 during straight air control of the brakes on the car and to disconnect said brake cylinder device from the straight air pipe 2 and to connect same to the automatic application and release pipe 10 during automatic control of the brakes on the car in combined automatic and straight air fluid pressure brake equipment is also well known and need not therefore be described in greater detail in the present application.

The auxiliary quick service valve device 4 comprises a casing having a bore within which is mounted a piston 12 subject on one side to the pressure of fluid in a chamber 13 communicating through a passage and pipe 14 with pipe 9 connected to brake pipe 1. The piston 12 is subject on the opposite side to fluid pressure in a valve chamber 15 which is connected through a passage 16 to a chamber 17 and thence through a passage 18 to a volume chamber 19, said chambers communicating with piston chamber 13, when the piston 12 is in its normal release position shown in the drawing, through a restricted charging port 20. The piston 12 is provided with a stem 21 which extends into the valve chamber 15 and which is suitably notched to receive a slide valve 22 which is adapted to be moved by and with the piston 12 in accordance with variations in pressure in the brake pipe chamber 13 and valve chamber 15.

The slide valve 22 of the auxiliary quick service device has a through port 23 connected to the valve chamber 15, and in the seating face of said valve there is provided a cavity 24, said port and cavity performing no function when the slide valve 22 is in its normal release position shown in the drawing.

The quick service piston 12 and thereby the valve 22 is adapted to be moved in the direction of the right hand to a quick service venting position defined by engagement of said piston with the casing, upon a reduction in pressure in chamber 13, as will be hereinafter described. In the quick service venting position of piston 12 port 23 in slide valve 22 is adapted to register with a vent passage 25 which is connected to a passage 26 leading to the atmosphere, while cavity 24 is adapted to connect a passage 27 to a passage 28. The passage 27 is in permanent communication with the brake pipe 1 through a choke 29 and chamber 13. The passage 28 leads to a valve chamber 30 which is normally open past an unseated cutoff valve 31 to a chamber 32 which is in communication with the vent passage 25 at all times.

In the casing of the auxiliary quick service valve device 4 there is provided a flexible diaphragm 50 subject on one face to the pressure of fluid in valve chamber 15 and on the opposite face to brake pipe pressure acting in a chamber 51 which is open to the brake pipe by way of a passage 52 leading to passage 27.

In valve chamber 15 there is provided a rocking pin 53 extending through a suitable opening in piston stem 21 with its lower end engaging the slide valve 22 within a recess. An enlarged head 54 on the opposite end of pin 53 engages the lower face of the diaphragm. This arrangement is provided to hold the slide valve 22 seated during charging of the brake pipe 1 at which time the brake pipe pressure acting in cavity 24 in slide valve 22 and tending to unseat said valve may increase more rapidly than that in valve chamber 15 through the charging port 20. However, the pressure of fluid in diaphragm chamber 51 also increases with brake pipe pressure, so that during charging of the brake pipe a differential will be obtained between the fluid pressures in chambers 51 and 15 which acting on diaphragm 50 and through pin 53 on slide valve 22 will firmly hold said slide valve seated. A spring 55 in chamber 51 acts on the diaphragm 50 and through stem 53 on slide valve 22 for holding said valve seated when the device is void of fluid pressure, as during shipment of the device.

The operation of the auxiliary quick service valve device 4 as so far described is as follows:

In conditioning the quick service valve device 4 for operation fluid under pressure supplied in the usual manner to brake pipe 1 flows through pipe 9 and pipe and passage 14 to piston chamber 13. With the piston 12 and slide valve 22 in their normal position shown, the restricted charging port 20 is open to piston chamber 13 so that fluid supplied to said chamber flows through said port to chamber 17 and thence to valve chamber 15 and to the volume chamber 19 charging said chambers to the same pressure as supplied to the brake pipe 2. The auxiliary quick service valve device is now in condition for operation upon a reduction in brake pipe pressure.

If it is desired to effect an automatic service application of the brakes on the car the pressure of fluid in brake pipe 1 is reduced in the usual well known manner and the brake controlling valve device 3 and quick service means therein respond to such reduction for supplying fluid under pressure to the application and release pipe 10 for supply to the brake cylinder device 6 to apply the brakes on the vehicle, and for also effecting a local quick service reduction in brake pipe pressure to propagate quick service action through the train. As hereinbefore described, the quick service means in the brake controlling valve device 3 acts as just described only upon initiating a reduction in pressure in the brake pipe 1 and is cut out of operation upon obtaining a predetermined relatively low degree of pressure in the brake cylinder device 6.

At the same time as the quick service means in the brake controlling valve device 3 operates to effect a local quick service reduction in brake pipe pressure the auxiliary quick service valve device 4 also operates to augment said reduction as will now be described.

When a service reduction in pressure in the brake pipe 1 is effected such reduction is effective in piston chamber 13 of the auxiliary quick service valve device 4. The charging port 20 is of insufficient size to permit the pressure in valve chamber 15 to reduce with that in chamber 13 so that a differential of fluid pressures is promptly built up on piston 12 and effects movement thereof from the normal position shown to the quick service venting position, above described.

In this quick service venting position cavity 24 in the slide valve 22, which was moved with the piston 12, connects the brake pipe passage 27 to the vent passage 28 and as a result allows fluid under pressure to flow from the brake pipe 1 through piston chamber 13, passage 27 and choke 29 to passage 28. Fluid thus vented from the brake pipe to passage 28 flows to chamber 30 and then past the normally unseated valve 31 to chamber 32 and from said chamber through the passages 25 and 26 to the atmosphere. The rate at which fluid pressure is thus vented from the brake pipe is governed by the flow capacity of choke 29 and is such as to effect a quick service reduction in pressure in the brake pipe of sufficient intensity to propagate quick service action serially through a train, it being noted however that at the time the brake pipe reduction is initiated this venting is in addition to that provided by the quick service means in the brake controlling valve device 3.

In the quick service venting position of slide valve 22, port 23 in said valve registers with passage 25 so that fluid under pressure is vented from the volume chamber 19 and valve chamber 15 to the atmosphere by way of said passage and passage 26, and when the pressure acting in valve chamber 15 is thus reduced to a degree slightly less than the reduced brake pipe pressure in piston chamber 13, the piston 12 shifts the slide valve 22 back to its normal position and closes communication between the brake pipe passage 27 and the vent passage 28 so as to terminate the quick service reduction in brake pipe pressure. In this manner the quick service valve device 4 is adapted to respond to each reduction in brake pipe pressure to effect a local quick service reduction in said pressure like the quick service means in brake equipment of the well known Universal valve type. Thus, in mixed trains some of the cars of which are equipped with the brake equipment shown in the drawing and others of which are equipped with brake equipment of the Universal valve type the quick service valve devices 4 will cooperate with the Universal valves to propagate quick service action through the train upon every reduction in brake pipe pressure regardless of the degree of brake application, so as to thereby provide a desired prompt and uniform control of the brakes on such trains.

According to the invention the valve 31 is provided to control communication between passages 28 and 26 through which the quick service venting of fluid from the brake pipe is effected by operation of the auxiliary quick service valve device 4 during automatic control of the brakes from the brake pipe 1.

For controlling the valve 31 there is provided a flexible diaphragm 35 which has at one side a chamber 36 open to the straight air pipe 2 at all times by way of a passage 37 and a pipe 38. At the opposite side of diaphragm 35 there is provided a chamber 39 which is open to the vent passage 25 and which contains a follower 40 disposed in engagement with the diaphragm 35. A sleeve 41 in chamber 39 has one end secured axially to the follower 40. The opposite end of the sleeve 41 is slidably mounted on the exterior surface of a boss 42 extending into the chamber 39, said boss being provided with an axial bore within which the fluted stem 43 of valve 31 is slidably mounted.

The valve 31 which is disposed within the sleeve 41 is provided with an enlarged head portion 44 and said sleeve has interiorly an annular shoulder 45 adapted to engage said head portion for pulling the valve 31 away from its seat upon downward movement of the sleeve 41, follower 40 and diaphragm 35. A spring 46 is interposed between the follower 40 and the head portion 44 of valve 31 for urging said valve in the direction of shoulder 45. Encircling sleeve 41 is a spring 47 bearing at one end against the end wall of chamber 39 and at the opposite end acting on the follower 40 for urging said follower and the diaphragm 35 in the direction of chamber 36. Movement of the diaphragm 35 in this direction is adapted to be limited by engagement of the diaphragm with the end wall of chamber 36 and when in this position the valve 31 is adapted to be unseated by shoulder 45 on the sleeve 41.

In the drawing the diaphragm 35, valve 31, and associated parts are shown in the position just described. The valve 31 is adapted to be thus unseated at all times when the straight air pipe 2 and thereby the diaphragm chamber 36 are void of fluid under pressure as when the brakes on the car are released, as well as when the brakes on the car are controlled automatically through the brake pipe as hereinbefore described. The valve 31 being unseated during automatic control of the brakes through the brake pipe provides for quick service venting of fluid under pressure from the brake pipe by operation of the quick service valve device 4, as hereinbefore described, as will be apparent.

However, when fluid under pressure is supplied to the straight air pipe 2 to effect a straight air application of the brakes, fluid flows from the straight air pipe through the pipe 38 and passage 37 to diagram chamber 36 and therein acts on the diaphragm 35 to deflect same in the direction of valve 31. When a relatively low fluid pressure, such as 1¼ lbs., is thus obtained in the diaphragm chamber 36 this pressure acting on the diaphragm overcomes the opposing pressure of spring 47 and deflects said diaphragm against said spring. This movement of the diaphragm acts through the follower 40, sleeve 41 and spring 46 to move the valve 31 into engagement with its seat.

It is desired to here point out that about five pounds per square inch pressure is required in a brake cylinder device such as the brake cylinder device 6 for operating same to move the usual brake shoes into contact with the wheels of a car and since the valve 31 is closed upon obtaining about 1¼ lbs. pressure in the straight air pipe, it will be apparent that such closure occurs promptly upon initiating a straight air application of the brakes and thus even before any actual braking of the car is obtained, in contrast to the cutting out of the quick service means in the brake controlling valve device 3 which does not occur until approximately 14 lbs. pressure is obtained in the brake cylinder device.

Upon a further increase in straight air pipe pressure in diaphragm chamber 36 to about 7¾ lbs. the diaphragm 35 is deflected upwardly relative to the valve 31 against the opposing pressures of both springs 46 and 47 to a position in which the follower 40 engages an annular shoulder 49 provided on the casing. With the parts thus conditioned it will be apparent that the valve 31 is urged against its seat by the force of spring 46 which is sufficient to insure that said valve will remain seated against pressure of fluid which might accumulate in chamber 39 by leakage through the auxiliary quick service valve device 4 or by operation thereof to connect said chamber to the brake pipe while the brakes on the vehicle are applied by straight air.

The auxiliary quick service valve device 4 may undesirably operate as just described during a straight air application of the brakes due to unavoidable fluctuations in pressure in the brake pipe 1, but since the valve 31 is closed such operation will not effect a quick service venting of fluid from the brake pipe 1 and thus initiate an automatic application of the brakes on a train. Thus in a brake equipment of the type shown having an auxiliary quick service valve device to provide quick service operation in harmony with a brake equipment of the Universal valve type the provision of the cut-off valve 31 controlled by straight air pipe pressure will prevent unwanted operation of the auxiliary quick service valve device during straight air control of the brakes when the brake equipment is operated in trains to be controlled either automatically or by straight air, as will be apparent.

When fluid under pressure is released from the straight air pipe 2 in order to effect a release of a straight air application of the brakes on the vehicle the fluid pressure in chamber 36 is released therewith which permits the spring 47 to return the diaphragm 35 to its normal position shown and thus pull the valve 31 away from its seat thereby again opening the auxiliary quick service vent communication between passages 28 and passage 25. Thus when a straight air application of the brakes on the vehicle is released the auxiliary quick service valve device 4 is conditioned to effect a quick service reduction in brake pipe pressure during automatic control of the brake equipment.

*Summary*

From the above it will be noted that the brake equipment shown in the drawing is adapted for use in trains on which the brakes are adapted to be controlled either automatically through the brake pipe 1 or by straight air through the straight air pipe 2, or in mixed trains where the brake equipment is adapted to be controlled entirely automatically through the brake pipe 1.

In mixed trains including cars equipped with the equipment shown in the drawing and cars equipped with equipment of the Universal valve type, the auxiliary quick service valve device 4 provides for harmonious quick service operation of the two different types of the brake equipment, and consequently prompt and uniform control of an application of brakes thereon.

The cut-off valve 31 however prevents unwanted quick service venting of fluid from the brake pipe by operation of the auxiliary quick service valve device 4 during a straight air application of the brakes on trains equipped for straight air control so as to thereby insure a complete straight air release of the brakes following a straight air application.

While only one embodiment of the invention has been shown it is not the intention to limit the scope to that embodiment or otherwise than by the terms of the appended claims.

Having now described my invention, what I claim as new and desire to secure by Letters Patent, is:

1. In a combined automatic and straight air brake equipment, in combination, a brake pipe, quick service means responsive to a reduction in brake pipe pressure to establish a communication for effecting quick service venting of fluid under pressure from said brake pipe, valve means operative upon a reduction in brake pipe pressure to effect an automatic application of brakes, a straight air pipe through which fluid under pressure is adapted to be supplied for effecting a straight air application of brakes, and means controlling said communication operative only in effecting a straight air application of brakes to close said communication.

2. In a combined automatic and straight air brake equipment, in combination, a brake pipe, quick service means responsive to a reduction in brake pipe pressure to establish a communication for effecting quick service venting of fluid under pressure from said brake pipe, valve means operative upon a reduction in brake pipe pressure to effect an automatic application of brakes, a straight air pipe through which fluid under pressure is adapted to be supplied for effecting a straight air application of brakes, and means responsive to a straight air application of brakes to close said communication, said means being non-responsive to an automatic application of brakes.

3. In a combined automatic and straight air brake equipment, in combination, a brake pipe, quick service means responsive to a reduction in brake pipe pressure to establish a communication for effecting quick service venting of fluid under pressure from said brake pipe, valve means operative upon a reduction in brake pipe pressure to effect an automatic application of brakes, a straight air pipe through which fluid under pressure is adapted to be supplied for effecting a straight air application of brakes, and means for controlling said communication responsive to a straight air application of brakes to close said communication and non-responsive to an application of brakes effected by the operation of said valve means.

4. In a combined automatic and straight air brake equipment, in combination, a brake pipe quick service means responsive to a reduction in brake pipe pressure to establish a communication for effecting quick service venting of fluid under pressure from said brake pipe, valve means operative upon a reduction in brake pipe pressure to effect an automatic application of brakes, a straight air pipe through which fluid under pressure is adapted to be supplied for effecting a straight air application of brakes, and means operable upon the initial supply of fluid under pressure to said straight air pipe, and prior to obtaining sufficient pressure therein for applying the brakes, to close said communication, said means being operative to open said communication upon the release of fluid under pressure from said straight air pipe.

5. In a combined automatic and straight air brake equipment, in combination, a brake pipe, a straight air pipe, quick service means adapted to respond to each reduction in brake pipe pressure in effecting a graduated application of brakes to establish a communication for effecting a quick service reduction in brake pipe pressure, and means open at all times to said straight air pipe and operative by fluid supplied to said straight air pipe to effect a straight air application of brakes to close said communication and operative upon the venting of fluid under pressure from said straight air pipe to open said communication.

6. In a combined automatic and straight air brake equipment, in combination, a brake pipe, a straight air pipe, quick service means operative upon each reduction in brake pipe pressure in effecting a graduated application of brakes to effect a quick service reduction in brake pipe pressure, and means subject at all times to pressure of fluid in said straight air pipe for controlling the operation of said quick service means and operative upon the supply of fluid to said straight air pipe to effect a straight air application of the brakes for rendering said quick service means non-operative to vent fluid under pressure from said brake pipe, said means being operative upon the venting of fluid under pressure from said straight air pipe to condition said quick service means for effecting a quick service reduction in brake pipe pressure.

7. In a combined automatic and straight air brake equipment, in combination, a brake pipe, a straight air pipe, quick service means adapted to respond to each reduction in brake pipe pressure in effecting a graduated application of brakes for effecting a quick service reduction in brake pipe pressure, and means conditionable by the pressure of fluid in said straight air pipe for controlling the operation of said quick service means and operative at all times when the straight air pipe is vented to render said quick service means operable to effect quick service venting of fluid from said brake pipe and when fluid pressure is supplied to said straight air pipe to effect a straight air application of the brakes to render said quick service means non-operable to vent fluid under pressure from said brake pipe.

8. In a combined automatic and straight air brake equipment, in combination, a brake pipe, a straight air pipe, quick service means adapted to respond to each reduction in brake pipe pressure in effecting a graduated application of brakes to establish a communication for effecting a quick service reduction in brake pipe pressure, valve means for controlling the operation of said quick service means to vent fluid under pressure from said brake pipe and conditionable to render said quick service means either effective or ineffective, and a movable abutment subject at all times to the pressure of fluid in said straight air pipe and operative thereby upon initiating a straight air application of the brakes to condition said valve means to render said quick service means ineffective and upon the release of fluid under pressure from said straight air pipe to condition said valve means to render said quick service means effective.

9. In a combined automatic and straight air brake equipment, in combination, a brake pipe, a straight air pipe, quick service means adapted to respond to a reduction in brake pipe pressure in effecting a graduated application of brakes to establish a communication for effecting a quick service reduction in brake pipe pressure, a valve for closing said communication, means subject at all times to pressure of fluid in said straight air pipe and operative upon the supply of fluid under pressure thereto in effecting a straight air application of the brakes to operate said valve to close said communication, and means operative upon the release of fluid under pressure from said straight air pipe to operate said valve to open said communication.

10. In a combined automatic and straight air brake equipment, in combination, a brake pipe, a straight air pipe, quick service means adapted to respond to each reduction in brake pipe pressure in effecting a graduated application of brakes to establish a communication for effecting a quick service reduction in brake pipe pressure, a valve for closing said communication, a spring, a movable abutment subject at all times to the opposing pressures of said spring and the pressure of fluid in said straight air pipe and operative by fluid supplied to said straight air pipe upon initiating a straight air application of the brakes to operate said valve to close said communication, said spring being operative to operate said valve to open said communication upon the venting of fluid under pressure from said straight air pipe.

11. In a combined automatic and straight air brake equipment, in combination, a brake pipe, a straight air pipe, quick service means adapted to respond to a reduction in brake pipe pressure to establish a communication for effecting a quick service reduction in brake pipe pressure, a valve for controlling said communication, a spring for urging said valve to a seated position for closing said communication, another spring having less force than the first named spring, a movable abutment subject to the opposing pressure of the last named spring and the pressure of fluid in said straight air pipe and operative upon a predetermined increase in pressure of fluid supplied to said straight air pipe for effecting a straight air application of the brakes to actuate the first named spring to seat said valve and upon a further increase in pressure in said straight air pipe to compress the first named spring to provide an increased force for holding said valve seated, and means operative upon the venting of fluid under pressure from said straight air pipe to unseat said valve.

12. In a combined automatic and straight air brake equipment, in combination, a brake pipe, a brake controlling valve device operative upon a service reduction in brake pipe pressure to supply fluid under pressure to an application and release pipe for effecting an automatic application of brakes, quick service means responsive to a reduction in brake pipe pressure to effect a quick service reduction in brake pipe pressure, a straight air pipe through which fluid under pressure is adapted to be supplied to said application and release pipe for effecting a straight air application of brakes, a double check valve device controlling communication between said pipe, and said brake controlling valve device and said straight air pipe, and means operative by fluid pressure supplied to said straight air pipe to render said quick service means inoperable to effect a quick service reduction in brake pipe pressure in effecting a straight air application of brakes, said means being operative upon the release of fluid pressure from said straight air pipe to render said quick service means operable to effect a quick service reduction in brake pipe pressure.

ELLIS E. HEWITT.